United States Patent
Rao et al.

(10) Patent No.: US 9,971,424 B2
(45) Date of Patent: May 15, 2018

(54) ALL-IN-ONE MACHINE AND METHOD AND COMPUTER MEMORY MEDIUM FOR REALIZING QUICK TOUCH IN ALL CHANNELS THEREOF

(71) Applicant: Guangzhou Shirui Electronics Co., Ltd., Guangdong (CN)

(72) Inventors: Haiqing Rao, Guangdong (CN); Songqing Xu, Guangdong (CN); Weigao Liu, Guangdong (CN); Ling Huang, Guangdong (CN); Jianxin Zhang, Guangdong (CN); Wensheng Cai, Guangdong (CN); Guining Pan, Guangdong (CN)

(73) Assignee: GUANGZHOU SHIRUI ELECTRONICS CO., LTD., Guangdong (CN)

( * ) Notice: Subject to any disclaimer, the term of this patent is extended or adjusted under 35 U.S.C. 154(b) by 349 days.

(21) Appl. No.: 14/781,704

(22) PCT Filed: Apr. 4, 2014

(86) PCT No.: PCT/CN2014/074862
§ 371 (c)(1),
(2) Date: Oct. 1, 2015

(87) PCT Pub. No.: WO2014/166370
PCT Pub. Date: Oct. 16, 2014

(65) Prior Publication Data
US 2016/0041629 A1 Feb. 11, 2016

(30) Foreign Application Priority Data

Apr. 7, 2013 (CN) .......................... 2013 1 0118652
Apr. 7, 2013 (CN) .......................... 2013 1 0118677
(Continued)

(51) Int. Cl.
*G06F 3/038* (2013.01)
*H04N 21/443* (2011.01)
(Continued)

(52) U.S. Cl.
CPC ............ *G06F 3/038* (2013.01); *G06F 3/0482* (2013.01); *H04N 5/4403* (2013.01);
(Continued)

(58) Field of Classification Search
CPC ..... G06F 3/038; G06F 3/0482; H04N 5/4403; H04N 21/4104; H04N 21/42224; H04N 21/4312; H04N 21/443; H04N 2005/443
See application file for complete search history.

(56) References Cited

U.S. PATENT DOCUMENTS

| 7,225,413 B1 | 5/2007 | Kuenzner et al. |
| 2005/0024341 A1 | 2/2005 | Gillespie et al. |

(Continued)

FOREIGN PATENT DOCUMENTS

| CN | 101714021 A | 5/2010 |
| CN | 202166919 U | 3/2012 |

(Continued)

OTHER PUBLICATIONS

International Search Report and Written Opinion for PCT/CN2014/074862; dated Jul. 15, 2014; 18 pages.
(Continued)

*Primary Examiner* — Tim T Vo
*Assistant Examiner* — Herve Iradukunda
(74) *Attorney, Agent, or Firm* — Steptoe & Johnson LLP (57) ABSTRACT

The present invention provides an all-in-one machine, a method for the all-in-one machine to realize quick touch in all channels, and a computer storage medium. The method includes: detecting which channel is currently connected to the main board, and controlling a USB selecting switch to
(Continued)

connect a first data port of a touch frame with a USB port of a device or module to which the currently connected channel belongs, based on the detected channel information; determining whether there is an action to call a touch menu when detecting that the channel connected to the main board is an internal PC module channel or an external device channel; and if so, activating the main board to start a touch menu application program, and making response, by the main board, to touch data within an area of the touch menu transmitted from the touch frame through the second data port, after the touch menu has been called and before an action of leaving the touch menu is detected. The present invention avoids wasting time in waiting for the USB to be identified that the user can perform a touch manipulation immediately after the USB selecting switch is switched.

19 Claims, 2 Drawing Sheets

(30) Foreign Application Priority Data

Apr. 7, 2013 (CN) .......................... 2013 1 0118678
Apr. 7, 2013 (CN) .......................... 2013 1 0118787

(51) Int. Cl.
*H04N 21/431* (2011.01)
*H04N 21/422* (2011.01)
*H04N 21/41* (2011.01)
*H04N 5/44* (2011.01)
*G06F 3/0482* (2013.01)

(52) U.S. Cl.
CPC ... *H04N 21/4104* (2013.01); *H04N 21/42224* (2013.01); *H04N 21/4312* (2013.01); *H04N 21/443* (2013.01); *H04N 2005/443* (2013.01)

(56) References Cited

U.S. PATENT DOCUMENTS

| 2008/0183909 | A1* | 7/2008 | Lim | G06F 13/4081 710/14 |
|---|---|---|---|---|
| 2008/0288707 | A1* | 11/2008 | Nicolet | G06F 13/4068 710/310 |
| 2010/0088531 | A1 | 4/2010 | Gao et al. | |
| 2010/0180055 | A1* | 7/2010 | Lyon | G06F 3/023 710/62 |
| 2010/0205336 | A1 | 8/2010 | Kakish | |
| 2010/0265194 | A1* | 10/2010 | Liu | G06F 3/04883 345/173 |
| 2011/0191713 | A1* | 8/2011 | Numazaki | G06F 3/048 715/800 |
| 2012/0075213 | A1* | 3/2012 | Huang | H04L 12/2814 345/173 |

FOREIGN PATENT DOCUMENTS

| CN | 102567265 A | 7/2012 |
|---|---|---|
| CN | 202362962 U | 8/2012 |
| CN | 102779434 A | 11/2012 |
| CN | 202565392 U | 11/2012 |
| CN | 102929544 A | 2/2013 |
| CN | 103019316 A | 4/2013 |
| CN | 103186323 A | 7/2013 |
| CN | 103197801 A | 7/2013 |
| CN | 103235658 A | 8/2013 |
| CN | 103235693 A | 8/2013 |
| WO | 02093542 A1 | 11/2002 |

OTHER PUBLICATIONS

Search Report and First Office Action for Chinese Pat Appl. No. 201310118787.7; dated May 25, 2015; 6 pages.
Search Report and First Office Action for Chinese Pat Appl. No. 201310118678.5; dated Apr. 1, 2015; 6 pages.
Second Office Action for Chinese Pat Appl. No. 201310118678.5; dated Oct. 28, 2015; 6 pages.
Search Report and First Office Action for Chinese Pat Appl. No. 201310118677.0; dated Jul. 3, 2015; 7 pages.
Second Office Action for Chinese Pat Appl. No. 201310118677.0; dated Mar. 7, 2016; 8 pages.
Search Report and First Office Action for Chinese Pat Appl. No. 201310118652.0; dated May 29, 2015; 7 pages.

* cited by examiner

ALL-IN-ONE MACHINE AND METHOD AND COMPUTER MEMORY MEDIUM FOR REALIZING QUICK TOUCH IN ALL CHANNELS THEREOF

CROSS REFERENCE TO RELATED APPLICATIONS

This patent application is a national stage of International Application No. PCT/CN2014/074862, filed Apr. 4, 2014, which claims priority to Chinese patent application Nos. CN 201310118787.7, filed Apr. 7, 2013; CN 201310118678.5, filed Apr. 7, 2013; CN 201310118677.0, filed Apr. 7, 2013; and CN 201310118652.0 filed Apr. 7, 2013, the disclosures of which are incorporated herein by reference.

FIELD

The present invention relates generally to the electronic and information field, and more particularly, to an all-in-one machine, a method for the all-in-one machine to realize quick touch in all channels, and a computer storage medium storing the method for realizing quick touch in all channels.

BACKGROUND

An interactive intelligent panel, also known as all-in-one machine, belongs to integrated equipment which combines the techniques in television, computer, touch and audio to realize the human-computer interaction. The all-in-one machine not only has the function of high definition display as a traditional liquid crystal display television, but also possesses computation capability by being configured an internal computer module. In addition, the computer can be operated by touch technology that a convenient man-machine interaction experience can be got. The all-in-one machine combines the display functions of multiple channels such as TV, internal PC, VGA, HDMI, AV and TPBPR. A remote controller or physical button is generally used for switching among the multiple channels or setting other features, but of course the touch function of the all-in-one machine can be used so that channel switching, volume adjustment, display settings or other features can be implemented through the touch menu in the all-in-one machine.

In a traditional all-in-one machine, a USB is used to transfer touch data between a touch frame and an internal TV, an internal PC or an external channel such as VGA, HDMI, AV and TPBPR. The switching between the external device and the internal system by touching can be implemented by switching the USB. For example, when an external device is connected, a main board with an Android system may control the USB selecting switch to switch to a corresponding external channel, and at this moment, the Android main board may be disconnected from the USB of the touch frame and may not read the touch data from the touch device, that is, the control of touch is handed over to the external device. In this case, when a touch menu is called for volume adjustment, display adjustment or other operations, the USB selecting switch is required to be switched to the Android main board so that the Android system which incorporates the touch menu as an application program can obtain the touch data. It takes some time for the Android main board to identify the USB device, so the touch menu cannot be immediately operated after switching to the Android main board. In addition, once the operations on the touch menu have been completed and the operations to be proceeded by the external channel are required, the USB selecting switch should be switched to the corresponding external channel. It also takes some time for the external device to identify the USB device, so the touch manipulation cannot be immediately performed. Thus it can be seen that it is very inconvenient to achieve the touch switching between the external device and the internal device by switching USB.

SUMMARY

Based on the above, in view of the problem existing in the prior art that the touch manipulation cannot be immediately performed after the USB is switched, it is necessary to provide an all-in-one machine, a method for the all-in-one machine to realize quick touch in all channels.

The following technical solutions are used to achieve the above purpose.

An all-in-one machine includes a touch frame, a USB selecting switch, an internal PC module, a main board and a display screen, wherein the display screen and the internal PC module are respectively connected to the main board, the USB selecting switch is connected to a USB port of the internal PC module, a first data port of the touch frame and a GPIO port of the main board respectively, and the touch frame is also connected to the main board through a second data port.

A method for an all-in-one machine to realize quick touch in all channels includes:

detecting which channel is currently connected to the main board, and controlling a USB selecting switch to connect a first data port of a touch frame with a USB port of a device or module to which the currently connected channel belongs, based on the detected channel information;

determining whether there is an action to call a touch menu when detecting that the channel connected to the main board is an internal PC module channel or an external device channel; and if there is an action to call a touch menu when detecting that the channel connected to the main board is the internal PC module channel or the external device channel, activating the main board to start a touch menu application program, and making response, by the main board, to touch data within an area of the touch menu transmitted from the touch frame through the second data port, after the touch menu has been called and before an action of leaving the touch menu is detected.

It can be seen from the above technical solutions that in the all-in-one machine and the method for the all-in-one machine to realize quick touch in all channels according to the present invention, the touch frame used two data output ports to output two paths of touch actions, in which one of the paths is output to the external device or the internal PC module, and the other is output to the main board, and the main board can make response to the touch data selectively according to the channel which is currently displayed. With the all-in-one machine and the method for the all-in-one machine to realize quick touch in all channels according to the present invention, it can ensure that whether the USB selecting switch is switched to the external device or the internal system, there is another touch device to provide touch data, avoiding wasting time in waiting for the USB to be identified, so it is very convenient for the user to perform a touch manipulation immediately after the USB selecting switch is switched.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

EXAMPLE ONE

Figure 1:
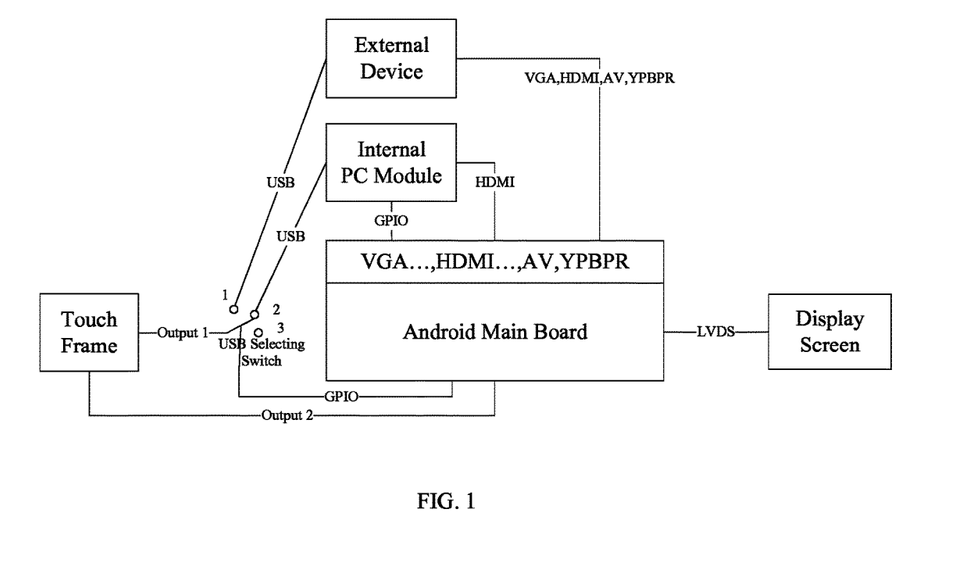
FIG. 1 is a schematic diagram illustrating an all-in-one machine according to Example One of the present invention.

As shown in FIG. 1, an all-in-one machine includes a touch frame, a USB selecting switch, an internal PC module, a main board and a display screen, wherein the display screen and the internal PC module are respectively connected to the main board, the USB selecting switch is connected to a USB port of the internal PC module, a first data port of the touch frame and a GPIO (General Purpose Input Output) port of the main board respectively, and the touch frame is also connected to the main board through a second data port.

As a preferred embodiment, the first data port may be a USB port, and the second data port may be a serial port or a USB port.

As a preferred embodiment, the display screen may be connected to the main board through a LVDS (Low Voltage Differential Signaling) interface.

As a preferred embodiment, the internal PC module may be connected to the main board through a HDMI (High Definition Multimedia Interface) interface.

As a preferred embodiment, the USB selecting switch may be connected to the external device via USB, and the external device can be connected to the main board through a VGA interface, a HDMI interface, an AV interface or YPBPR interface.

In the embodiment, the main board may be configured to detect which channel is currently connected to the main board, control the USB selecting switch based on the detected channel information to connect the first data port of the touch frame with a USB port of a device or module to which the currently connected channel belongs, determine whether there is an action to call a touch menu when detecting that the channel connected to the main board is an internal PC module channel or an external device channel, start a touch menu application program if it is determined that there is the action to call the touch menu, and make response to touch data within an area of the touch menu transmitted from the touch frame through the second data port, after the touch menu has been called and before an action of leaving the touch menu is detected.

As shown in FIG. 1, in one embodiment, the USB selecting switch may include three selecting positions: first selecting position, second selecting position and third selecting position. The first selecting position may correspond to the external device, the second selecting position may correspond to the internal PC module, and the third selecting position may be a free end. The main board may detect which channel is currently connected to the main board. If the channel connected to the main board is detected to be an external device channel or an internal PC module channel, the main board may control the USB selecting switch to switch to the first selecting position or the second selecting position, to make the first data port be connected with the USB port of the external device or the internal PC module. If the channel connected to the main board is detected to be a TV channel that is provided in the main board, the main board may control the USB selecting switch to switch to the third selecting position, and the first data port of the touch frame may no longer transmit the touch data.

In addition, as a preferred embodiment, the main board may include a first determination module configured to receive the touch data from the display screen through the second data port of the touch frame, determine whether the touch data is a touch action within a preset area on the display screen, and if so, determine there is an action to call a touch menu. The preset area is an area which is set in advance on the display screen to be activated to call a touch menu.

The traditional all-in-one machine uses a remote controller or physical button for calling the menu, and the called menu is untouchable that the operation on the menu depends on the remote controller or physical button. The present invention is intended to call the menu by touching. In the present invention, the setup menu, such as volume setup, display setup and channel switching is called as a touch menu. In the embodiment, it is necessary to provide an area that is the preset area on the display screen as an activation area for calling the menu at first, and when a finger or a touch pen touches the area, the touch action will transmit to the touch frame. In this method, the second data port of the touch frame of the all-in-one machine is used to receive the touch data and determine whether the touch data is a touch action within the preset area. If the received touch data is determined to be a touch action within the preset area, an application program of touch menu is started to display the touch menu on the display screen, and the user can perform operations on the touch menu by touching. If the received touch data is determined to be not a touch action within the preset area and the channel connected to the main board is a TV channel, corresponding operations may done according to the received touch data.

As a preferred embodiment, the preset area may be the black border arranged around the display screen (or other areas designated).

Further, as a preferred embodiment, the channel that may be currently connected to the main board may include an external device channel, an internal PC module channel or TV channel.

EXAMPLE TWO

Figure 2:
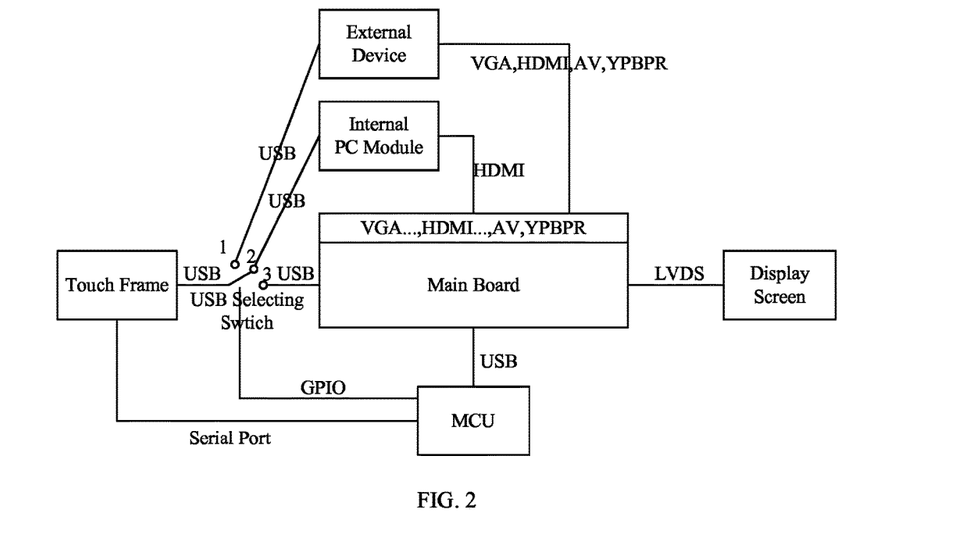
FIG. 2 is a schematic diagram illustrating an all-in-one machine according to Example Two of the present invention.

As shown in FIG. 2, based on the structure of the all-in-one machine in the Example One, the all-in-one machine in the embodiment further includes a MCU (Micro Control Unit) connected between the second data port of the touch frame and the main board. In addition, the MCU may be connected to the USB selecting switch via GPIO (in this case, the control of the main board to the USB selecting switch is implemented by the MCU).

The MCU may be configured to detect which channel is currently connected to the main board, control the USB selecting switch based on the detected channel information to connect the first data port of the touch frame with a USB port of a device or module to which the currently connected channel belongs, determine whether there is an action to call a touch menu when detecting that the channel connected to the main board is an internal PC module channel or an external device channel, inform the main board to start a touch menu application program if it is determined that there is the action to call the touch menu. And the MCU may be also configured to receive the touch data within the area of the touch menu from the touch frame through the second data port, simulate itself as a standard USB touch device, and transmit the touch data within the area of the touch menu to the main board through the first USB port connected with the main board, after the touch menu has been called and before an action of leaving the touch menu is detected.

The main board may start the touch menu application program based on the information from the MCU, and make response to the touch data within the area of the touch menu received through the first USB port.

In the embodiment, it is important to note that the MCU may filter and process the touch data transmitted from the touch frame through the second data port, and if the MCU detects the touch data is not an action to call the touch menu, the MCU will actively mask the touch data transmitted from the touch frame through the serial port, and not transmit the touch data to the main board.

In the present invention, the touch action on the display screen can be received through the second data port on the touch frame so that the touch action can be received in any channel, and the MCU can transmit a command of calling the touch menu to the main board via the USB so that the command can be transmitted quickly without waiting for a driver installation.

Specifically, the MCU may simulate the function of the touch frame as follows. Take, for example, the case that the second data port of the touch frame is a serial port, the touch frame may output touch data in both the USB channel and the serial port channel, and the MCU may configure the descriptor of multi-touch of the USB after receiving the touch data transmitted from the touch frame through the serial port so that the USB of the MCU can be identified by the main board as a touch device. And if the main board receives the touch data from the MCU at this moment, the touch data will be considered by the main board, as a touch event form a standard touch device, and the main board will make response to the touch data.

In addition, as shown in FIG. 2, in addition to the first USB port configured to be connected to the MCU, the main board may further include a second USB port configured to be connected to the touch frame, and the USB selecting switch is connected to the main board through the second USB port. In this case, the MCU may also have the function of controlling the USB selecting switch to connect the first data port of the touch frame to the second USB port of the main board when the channel currently connected to the main board is detected to be a TV channel, and the main board may make response to the touch data transmitted from the touch frame through the first data port.

It is important to note that the USB selecting switch may select only one of the internal PC module, the main board and the external device to be connected at each switching, based on the control of the switch.

As a preferred embodiment, the MCU may include a second determination module configured to receive the touch data from the display screen through the second data port of the touch frame, determine whether the touch data is a touch action within a preset area on the display screen, and if so, determine there is an action to call a touch menu. The preset area is an area which is set in advance on the display screen to be activated to call a touch menu.

It can be understood that, although the terms "first" and "second" may be used herein to describe various features/elements, these features/elements should not be limited by these terms, unless the context indicates otherwise. These terms may be used to distinguish one feature/element from another feature/element. For example, the first determination module discussed above could be termed a second determination module, and similarly, the second determination module second determination module a first determination module determination module. Both of the first determination module and the second first determination module are determination modules, but not a same determination module.

As a preferred embodiment, the main board may be a main board with an Android system (hereinafter referred to as Android main board). Take the Android main board, for example and the process will be described in detail as follows.

When the all-in-one machine works on a channel of VGA interface, HDMI interface, AV interface, YPBPR interface or internal PC module (i.e., the USB selecting switch is switched to the first or second selecting position), and the user calls the touch menu, the USB selecting switch will not be controlled to be switched to the third selecting position, and a "touch frame" will be simulated by the first USB of the MCU connected to the Android main board. Because the main program of the Android system is always running, the touch manipulation on the touch menu can be quickly performed after the touch menu has been revealed. After the above touch manipulation has been completed, touch manipulation on the external device or the internal PC can be quickly performed, because there is no switching action for the USB of the touch frame connected to the external device or internal PC. Thus it can be seen that the technical solution according to the present invention can ensure the manipulation on the touch menu controlled by the Android system is effective and the touch manipulation to be proceeded by the external channel can be quickly performed after the manipulation on the touch menu has been completed.

In the embodiment, the Android main board can selectively make response to the touch data according to the channel which is currently displayed. Specifically, for the external or internal computer channel, the Android main board may only make response to the touch data on the touch menu from the serial port simulated as a USB by the MCU, and only make response to the touch data within in the area of the touch menu (resulting in operations for the touch menu) and not to the touch data from other areas during the period from the touch menu being called to leaving the touch menu.

Let's continue taking the Android main board, for example and the work process of the all-in-one machine in this example will be described in detail as follows.

When the user switches to a channel of the Android smart TV (i.e., TV channel), the Android main board may communicate with the MCU via USB, inform the MCU to switch the USB selecting switch to USB3 that is the second USB connected to the main board by the GPIO of the MCU. At this moment, the Android main board may make response to the touch data from the USB3 to implement the touch control of the Android smart TV.

When the user switches to the internal computer, the Android main board may switch to the HDMI channel to display the display output of the internal computer, and the Android main board may inform the MCU to switch the USB selecting switch to the internal PC module channel by controlling the GPIO of the MCU. At this moment, the touch frame may provide touch data to the internal computer to implement the touch control and display of the internal computer.

When the user switches to the external computer, the external computer may transmit the display output to the Android main board for display via a HDMI interface, a VGA interface, an AV interface or a YPBPR interface, and the MCU may control the USB selecting switch to switch to the USB1 for the external computer so that the touch frame can transmit the touch data to the external computer to implement the touch control and display of the external computer.

The other technical features of the all-in-one machine in this example are the same as those in the Example One, and they will therefore not be discussed in detail here.

EXAMPLE THREE

Figure 3:
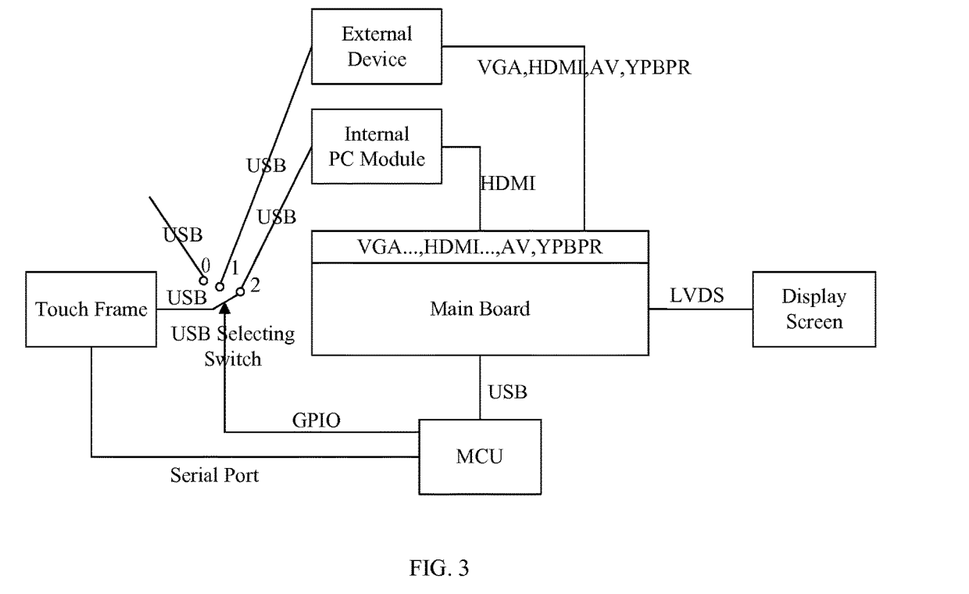
FIG. 3 is a schematic diagram illustrating an all-in-one machine according to Example Three of the present invention.

As shown in FIG. 3, the difference between the all-in-one machine in this example and that in the Example two is that the all-in-one machine does not include the second USB port connected to the main board but a USB port which is not connected to any device and to which the USB selecting switch is switched to when the first data port of the touch frame is required to be close.

In addition, the function of the MCU in the example is slightly different from that in the Example Two. Specifically, when the MCU has detected the channel currently connected to the main board is the TV channel, the MCU may control the USB selecting switch to close the first data port of the touch frame, receive the touch data from the touch frame through the second data port, simulate itself as a standard USB touch device, and transmit all of the touch data collected by the touch frame to the main board through the first USB port connected to the main board. At this moment, the main board may make response to all of the touch data received from the first USB port.

Take the Android main board, for example and the work process of the all-in-one machine in this example will be described in detail as follows. The touch frame may output touch data in both the USB channel and the serial port channel, in which the USB channel is connected to the USB selecting switch which can be switched between the first selection position and the second selection position by the MCU to switch to the USB port of the external device and the USB port of the internal PC module respectively. In addition, the touch frame transmits touch data to the MCU through the serial port, and the MCU simulates itself as a standard USB touch device after receiving the touch data, and transmits the data to the Android main board via the USB to make sure the Android main board can perform touch manipulation to the application of the Android main board in any channel. When the TV channel is switched to the VGA, HDMI, AV, YPBPR or internal PC module channel, the MCU may control the USB selecting switch to switch to a corresponding channel. Because it takes some time for the process of the above channel from no signal to signal displaying, and the internal or external device has identified the USB of the touch frame in this time, touch manipulation can be immediately performed after the signal from the external device channel has been displayed.

The switch between the TV channel and the external device channel or the internal PC module channel of the all-in-one machine can be operated by the touch menu. The touch menu is an application of the Android program. When the Android main board receives a command of calling the touch menu sent from the MCU, the touch menu may start, and the user may perform touch manipulation on the touch menu. In the embodiment, once the all-in-one machine is in a VGA, HDMI, AV, YPBPR or internal PC channel, the touch manipulation on the touch menu can be quickly performed after the touch menu has been revealed, because the main program of the Android system is always running. After the above touch manipulation has been completed, touch manipulation on the external device or the internal PC can be quickly performed, because there is no switching action for the USB of the touch frame connected to the external device or internal PC.

In the embodiment, the Android main board can selectively make response to the touch data according to the channel which is currently displayed. Specifically, when the user switches to the TV channel, the Android main board may communicate with the MCU via USB, inform the MCU to close the USB touch data output of the touch frame, and make response to all of the touch data transmitted from the USB simulated by the MCU connected to the touch frame through the serial port. When the user switches to the internal PC module or external device channel, the Android main board may inform the MCU through the USB, and the MCU may control the USB selecting switch to switch to a corresponding USB1 or USB2, to make the internal PC module or the external device obtain the touch data of the touch frame. At this moment, the Android main board may only make response to the action of calling the touch menu and the touch data within in the area of the touch menu (resulting in operations for the touch menu) and not to the touch data from other areas during the period from the touch menu being called to leaving the touch menu.

As a preferred embodiment, the method for closing the touch data output of the first data port of the touch frame includes:

i) transmitting, by the MCU, data to the touch frame through the serial port to inform the touch frame to close the USB data output of the touch frame, in which no matter where the USB selecting switch is switched, the back-end of the USB selecting switch does not receive the touch data; and ii) the all-in-one machine further including a USB0 that is not connected with any device, as shown in FIG. 3. In this way, when the touch data output of the first data port of the touch frame is required to be closed, the MCU may control the USB selecting switch to switch to the USB0 by the GPIO, and all of the external device and the internal PC module are unable to receive the touch data of the touch frame due to the USB0 being not connected with any device.

The other technical features of the all-in-one machine according to the example are the same as those in the Example Two, and they will therefore not be discussed in detail here.

Figure 4:
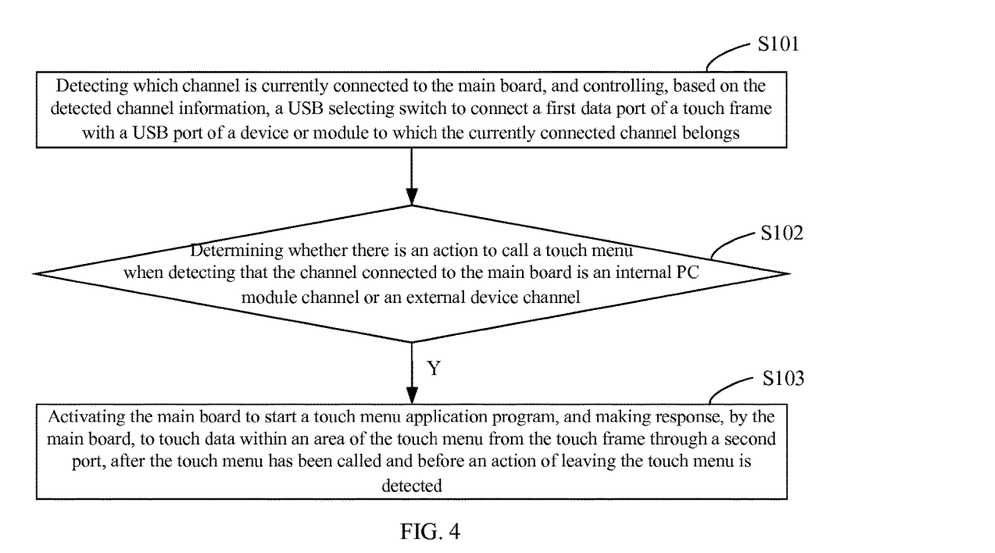
FIG. 4 is a flow diagram illustrating a method for an all-in-one machine to realize quick touch in all channels according to certain embodiments of the present invention.

In addition, corresponding to the all-in-one machine of the present invention, the present invention also provides a method for an all-in-one machine to realize quick touch in all channels, as shown in FIG. 4, including:

step S101, detecting which channel is currently connected to the main board, and controlling a USB selecting switch to connect a first data port of a touch frame with a USB port of a device or module to which the currently connected channel belongs, based on the detected channel information;

step S102, determining whether there is an action to call a touch menu when detecting that the channel connected to the main board is an internal PC module channel or an external device channel; and step S103, if there is an action to call a touch menu in the determination of the step S102, activating the main board to start a touch menu application program, and making response, by the main board, to touch data within an area of the touch menu from the touch frame through the second data port, after the touch menu has been called and before an action of leaving the touch menu is detected.

As a preferred embodiment, the determining whether there is an action to call a touch menu includes: receiving, the touch data on the display screen from the second data port of the touch frame, determining whether the touch data is the touch action in the preset area on the display screen, and determining there is an action to call a touch menu if so. The preset area is an area which is set in advance on the display screen to be activated to call a touch menu.

As a preferred embodiment, the preset area may be the black border arranged around the display screen.

As a preferred embodiment, the main board may be an Android main board.

As a preferred embodiment, the channel currently connected to the main board may include an external device channel, an internal PC module or a TV channel.

As a preferred embodiment, the method of the present invention further includes:

controlling the USB selecting switch to close the first data port of the touch frame, when the channel currently connected to the main board is detected to be a TV channel; and making response, by the main board, to all of the touch data transmitted from the touch frame through the second data port.

Specifically, the controlling the USB selecting switch to close the first data port of the touch frame includes controlling the USB selecting switch to switch to a USB port that is not connected to any device.

As a preferred embodiment, the method of the present invention further includes:

controlling the USB selecting switch to connect the first data port of the touch frame to the second USB port of the main board; and making response, by the main board, to all of the touch data transmitted from the touch frame through the first data port.

As a preferred embodiment, the first data port may be a USB port, and the second data port may be a serial port or USB port.

The other technical features of the method for the all-in-one machine to realize quick touch in all channels are the same as those of the all-in-one machine of the present invention, and they will therefore not be discussed in detail here.

It will be appreciated for those skilled in the art that parts of or overall process and corresponding devices or units in the above embodiments can be implemented by related hardware controlled by computer program, the computer program can be stored in a computer-readable storage medium, and when the computer program is executed, it can include the processes of the above embodiments of each method. Wherein, the non-transitory computer-readable storage medium can be a disc, a compact disc, a Read-Only Memory or a Random Access Memory. Thus, according to the above embodiments of the present invention, a computer-readable storage medium is further provided. When the computer program stored in the computer-readable storage medium is executed, it can implement any of the above methods for the all-in-one machine to realize quick touch in all channels.

The methods in the embodiments according to the present invention as mentioned above can be in a form of software and installed in a corresponding device, and the process of performing remote control on the external computer can be implemented by related process unit controlled by the software when the software is running. The above process unit may be arranged or installed in a corresponding terminal device, or itself may be a corresponding terminal device accordingly, such as mobile phone, tablet computer, PDA (Personal Digital Assistant), POS (Point of Sales), onboard computer or any other terminal devices.

It should be noted that the singular forms "a", "an" and "the" are intended to include the plural forms as well, unless the context clearly indicates otherwise. The order in which various described method steps are performed may often be changed in alternative embodiments, and in other alternative embodiments one or more method steps may be skipped altogether.

The above are preferred embodiments of the invention described in detail, and should not be deemed as limitations to the scope of the present invention. It should be noted that variations and improvements will become apparent to those skilled in the art to which the present invention pertains without departing from its spirit and scope. Therefore, the scope of the present invention is defined by the appended claims.

The invention claimed is:

1. An all-in-one machine, comprising a touch frame, a USB selecting switch, an internal PC module, a main board and a display screen, wherein the display screen and the internal PC module are respectively connected to the main board, the USB selecting switch is connected to a USB port of the internal PC module, a first data port of the touch frame and a GPIO port of the main board respectively, and the touch frame is also connected to the main board through a second data port, and further comprising a MCU connected between the second data port of the touch frame and the main board, wherein the MCU is further connected to the USB selecting switch via GPIO, wherein the MCU is configured to detect which channel is currently connected to the main board, control the USB selecting switch based on the detected channel information to connect the first data port of the touch frame with a USB port of a device or module to which the currently connected channel belongs, determine whether there is an action to call a touch menu when detecting that the channel currently connected to the main board is an internal PC module channel or an external device channel, and inform the main board to start a touch menu application program if it is determined that there is the action to call the touch menu; the MCU is also configured to receive the touch data within the area of the touch menu transmitted from the touch frame through the second data port, simulate itself as a standard USB touch device, and transmit the touch data within the area of the touch menu to the main board through a first USB port connected with the main board, after the touch menu has been called and before an action of leaving the touch menu is detected; and the main board is configured to start the touch menu application program based on the information from the MCU, and make response to the touch data within the area of the touch menu received through the first USB port.

2. The all-in-one machine of claim 1, wherein the main board is configured to detect which channel is currently connected to the main board, control the USB selecting switch based on the detected channel information to connect the first data port of the touch frame with a USB port of a device or module to which the currently connected channel belongs, determine whether there is an action to call a touch menu when detecting that the channel currently connected to the main board is an internal PC module channel or an external device channel, start a touch menu application program if it is determined that there is the action to call the touch menu, and make response to touch data within an area of the touch menu transmitted from the touch frame through the second data port, after the touch menu has been called and before an action of leaving the touch menu is detected.

3. The all-in-one machine of claim 1, wherein the first data port is a USB port, and the second data port is a serial port or USB port.

4. The all-in-one machine of claim 1, wherein the channel currently connected to the main board comprises an external device channel, an internal PC module or a TV channel.

5. The all-in-one machine of claim 4, wherein the MCU is also configured to, when the MCU has detected that the channel currently connected to the main board is the TV channel, control the USB selecting switch to close the first data port of the touch frame, receive the touch data transmitted from the touch frame through the second data port, simulate itself as a standard USB touch device, and transmit all of the touch data collected by the touch frame to the main board through the first USB port connected to the main board; and the main board makes response to said all of the touch data received through the first USB port.

6. The all-in-one machine of claim 5, further comprising a USB port that is not connected with any device, wherein when the first data port of the touch frame is required to be closed, the USB selecting switch is switched to the USB port that is not connected with any device.

7. The all-in-one machine of claim 4, wherein the main board further comprises a second USB port through which the USB selecting switch is connected to the main board.

8. The all-in-one machine of claim 7, wherein the main board is further configured to control the USB selecting switch to connect the first data port of the touch frame to the second USB port of the main board when the channel currently connected to the main board is detected to be a TV channel; and the main board is configured to make response to all the touch data transmitted from the touch frame through the first data port.

9. The all-in-one machine of claim 2, wherein the main board comprises a first determination module configured to receive the touch data from the display screen through the second data port of the touch frame, determine whether the touch data is a touch action within a preset area on the display screen, and if so, determine there is an action to call a touch menu; and the preset area is an area which is pre-set on the display screen to be activated to call a touch menu.

10. The all-in-one machine of claim 1, wherein the MCU comprises a second determination module configured to receive the touch data from the display screen through the second data port of the touch frame, determine whether the touch data is a touch action within a preset area on the display screen, and if so, determine there is an action to call a touch menu; and the preset area is an area which is pre-set on the display screen to be activated to call a touch menu.

11. The all-in-one machine of claim 9, wherein the preset area is black border arranged around the display screen.

12. The all-in-one machine of claim 4, wherein the USB selecting switch is connected to the external device via a USB, and the external device is connected to the main board through a VGA interface, a HDMI interface, an AV interface or YPBPR interface.

13. A method for an all-in-one machine to realize quick touch in all channels, comprising:

detecting which channel is currently connected to a main board, and controlling, based on a detected channel information, a USB selecting switch to connect a first data port of a touch frame with a USB port of a device or module to which the currently connected channel belongs;

determining whether there is an action to call a touch menu when detecting that the channel connected to the main board is an internal PC module channel or an external device channel; and if it is determined that there is an action to call a touch menu when detecting that the channel connected to the main board is the internal PC module channel or the external device channel, activating the main board to start a touch menu application program, and making response, by the main board, to touch data within an area of the touch menu transmitted from the touch frame through a second data port, after the touch menu has been called and before an action of leaving the touch menu is detected, wherein the all-in-one machine comprises a MCU connected between the second data port of the touch frame and the main board, wherein the MCU is further connected to the USB selecting switch via GPIO, wherein the MCU is configured to detect which channel is currently connected to the main board, control the USB selecting switch based on the detected channel information to connect the first data port of the touch frame with a USB port of a device or module to which the currently connected channel belongs, determine whether there is an action to call a touch menu when detecting that the channel currently connected to the main board is an internal PC module channel or an external device channel, and inform the main board to start a touch menu application program if it is determined that there is the action to call the touch menu; the MCU is also configured to receive the touch data within the area of the touch menu transmitted from the touch frame through the second data port, simulate itself as a standard USB touch device, and transmit the touch data within the area of the touch menu to the main board through a first USB port connected with the main board, after the touch menu has been called and before an action of leaving the touch menu is detected; and the main board is configured to start the touch menu application program based on the information from the MCU, and make response to the touch data within the area of the touch menu received through the first USB port.

14. The method of claim 13, wherein the determining whether there is an action to call a touch menu comprises:

receiving the touch data on the display screen from the second data port of the touch frame, determining whether the touch data is a touch action in the preset area on the display screen, and determining there is an action to call a touch menu if the answer is yes; and the preset area is an area which is pre-set on the display screen to be activated to call a touch menu.

15. The method of claim 13, further comprising:
controlling the USB selecting switch to close the first data port of the touch frame, when the channel currently connected to the main board is detected to be a TV channel; and
making response, by the main board, to all of the touch data transmitted from the touch frame through the second data port.

16. The method of claim 15, wherein the controlling the USB selecting switch to close the first data port of the touch frame comprises controlling the USB selecting switch to switch to a USB port that is not connected to any device.

17. The method of claim 13, further comprising:
controlling the USB selecting switch to connect the first data port of the touch frame to the second USB port of the main board when the channel currently connected to the main board is detected to be a TV channel; and
making response, by the main board, to all of the touch data transmitted from the touch frame through the first data port.

18. The method of claim 15, wherein the first data port is a USB port, and the second data port is a serial port or USB port.

19. A non-transitory computer-readable storage medium storing computer-executable instructions which, when executed, perform the method for the all-in-one machine to realize quick touch in all channels according to claim 13.

\* \* \* \* \*